United States Patent
Nakasha

(10) Patent No.: US 9,667,311 B2
(45) Date of Patent: May 30, 2017

(54) PULSE POSITION MODULATION SCHEME IMPULSE RADIO TRANSMITTER AND RADIO COMMUNICATION SYSTEM

(71) Applicant: FUJITSU LIMITED, Kawasaki-shi, Kanagawa (JP)

(72) Inventor: Yasuhiro Nakasha, Hadano (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/081,907

(22) Filed: Mar. 27, 2016

(65) Prior Publication Data
US 2016/0211884 A1    Jul. 21, 2016

Related U.S. Application Data

(63) Continuation of application No. PCT/JP2013/076851, filed on Oct. 2, 2013.

(51) Int. Cl.
*H04B 1/00* (2006.01)
*H04B 1/7163* (2011.01)
(Continued)

(52) U.S. Cl.
CPC ......... *H04B 1/71635* (2013.01); *H04B 1/717* (2013.01); *H04B 1/7176* (2013.01)

(58) Field of Classification Search
USPC .................. 375/146, 130, 295, 246; 455/102
See application file for complete search history.

(56) References Cited

U.S. PATENT DOCUMENTS 5,553,276 A * 9/1996 Dean ............... G06F 9/3871
                                                  712/E9.063
2002/0176486 A1* 11/2002 Okubo ............. H04B 14/026
                                                       375/146
(Continued)

FOREIGN PATENT DOCUMENTS

EP    2621099       7/2013
JP    H10-508725    8/1998
(Continued)

OTHER PUBLICATIONS

International Search Report, mailed in connection with PCT/JP2013/076851 and mailed Dec. 17, 2013 (2 pages).

*Primary Examiner* — Wendel Cadeau
(74) *Attorney, Agent, or Firm* — Fujitsu Patent Center

(57) ABSTRACT

A pulse position modulation scheme impulse radio transmitter includes: a bipolar return-to-zero type short-pulse generator; a bandpass filter that has a predetermined pass frequency band and which allows an output of the bipolar return-to-zero type short-pulse generator to pass; a transmission amplifier that amplifies an output of the bandpass filter; and a transmission antenna, wherein the bipolar return-to-zero type short-pulse generator includes: a trigger flip-flop with a position modulation function that outputs a pulse-width-variable pulse in each period of a clock signal, the pulse-width-variable pulse being inverted in each period of the clock signal and the pulse width of the pulse-width-variable pulse differing in accordance with transmission data; and a pulse generation filter that generates a positive pulse or a negative pulse in accordance with a direction in which a varying edge of the pulse-width-variable pulse changes.

16 Claims, 11 Drawing Sheets

(51) Int. Cl.
*H04B 1/7176* (2011.01)
*H04B 1/717* (2011.01)

(56) References Cited

U.S. PATENT DOCUMENTS

| | | |
|---|---|---|
| 2002/0190786 A1 | 12/2002 | Yoon et al. |
| 2003/0043931 A1 | 3/2003 | Fullerton et al. |
| 2005/0009478 A1* | 1/2005 | Mohan .................. H04H 20/30 455/102 |
| 2006/0285578 A1 | 12/2006 | Weisenhorn et al. |
| 2007/0063752 A1* | 3/2007 | Kowalczyk ............ H03K 3/037 327/202 |
| 2008/0198939 A1* | 8/2008 | Nakasha ............ H04B 1/71635 375/256 |
| 2013/0034131 A1 | 2/2013 | Nakasha et al. |
| 2013/0195216 A1* | 8/2013 | Nakasha ................ H04L 25/03 375/295 |

FOREIGN PATENT DOCUMENTS

| | | |
|---|---|---|
| JP | 2002-271428 | 9/2002 |
| JP | 2007-518301 | 7/2007 |
| JP | 2013-34075 | 2/2013 |
| JP | 2013-157660 | 8/2013 |
| WO | 9609694 | 3/1996 |
| WO | 0209329 | 1/2002 |
| WO | 2005074150 | 8/2005 |

* cited by examiner

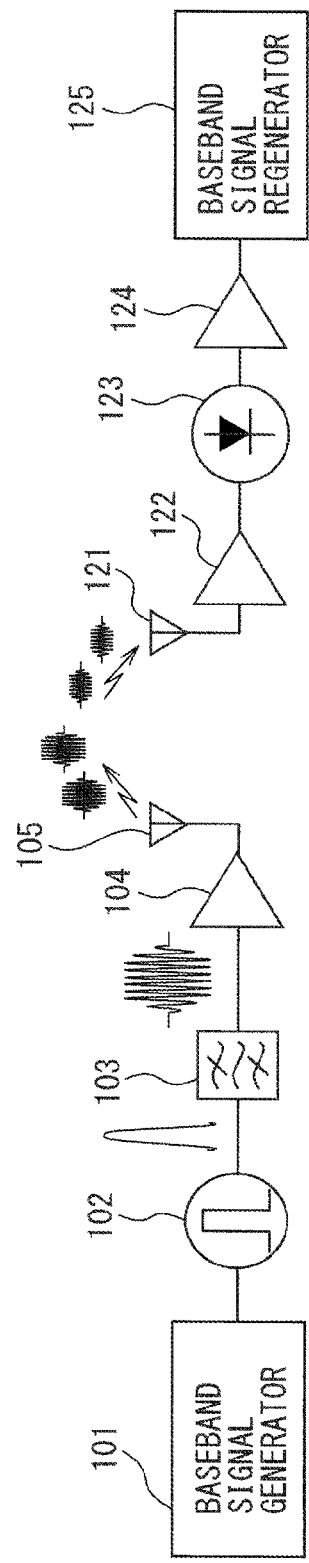
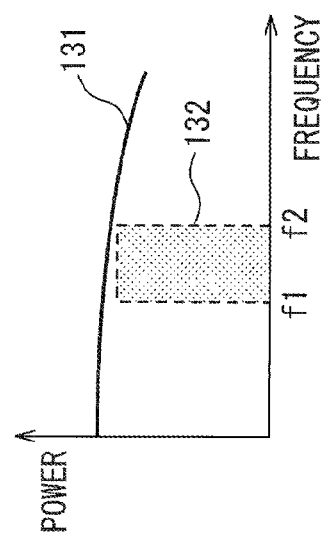

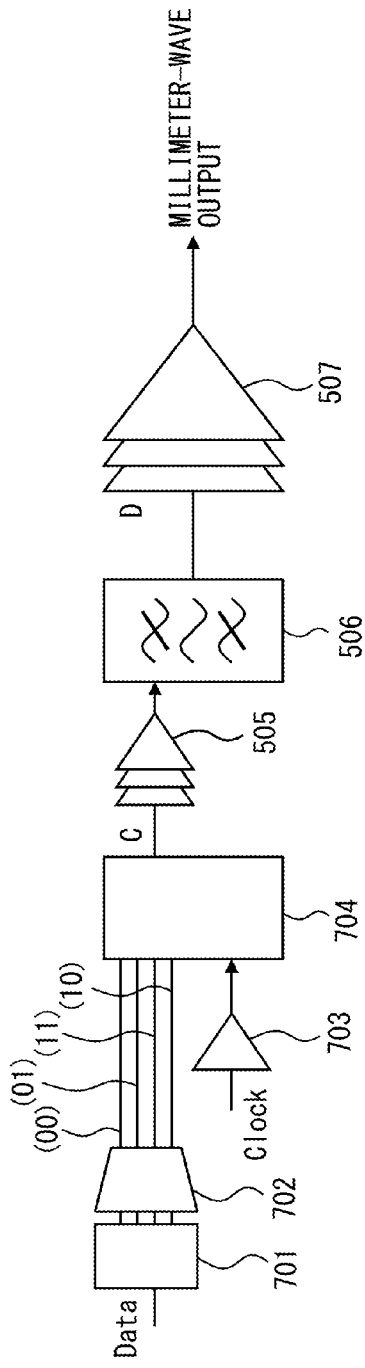
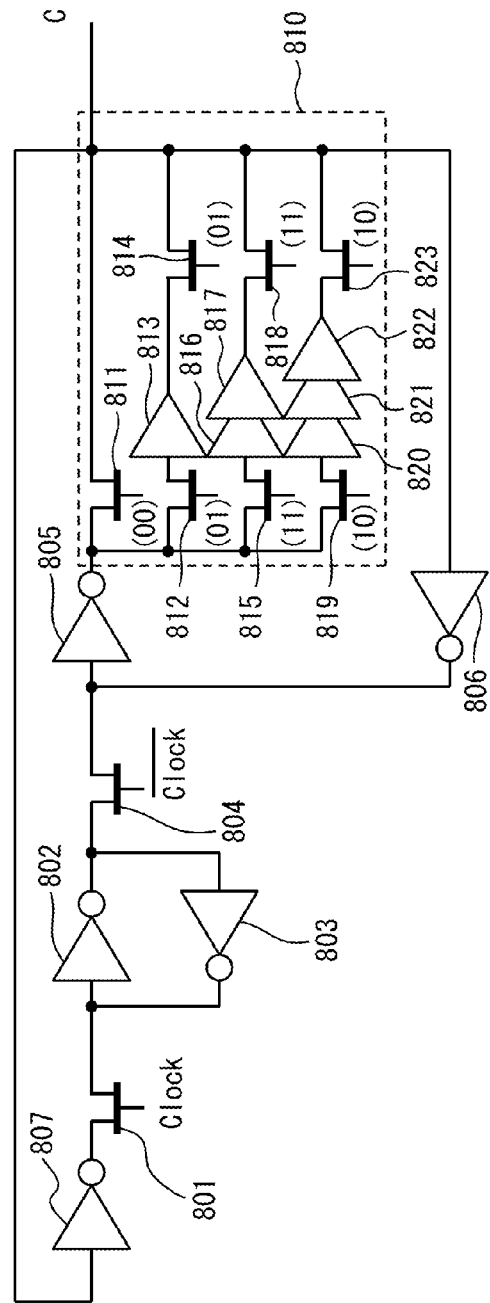
FIG. 4A
FIG. 4B

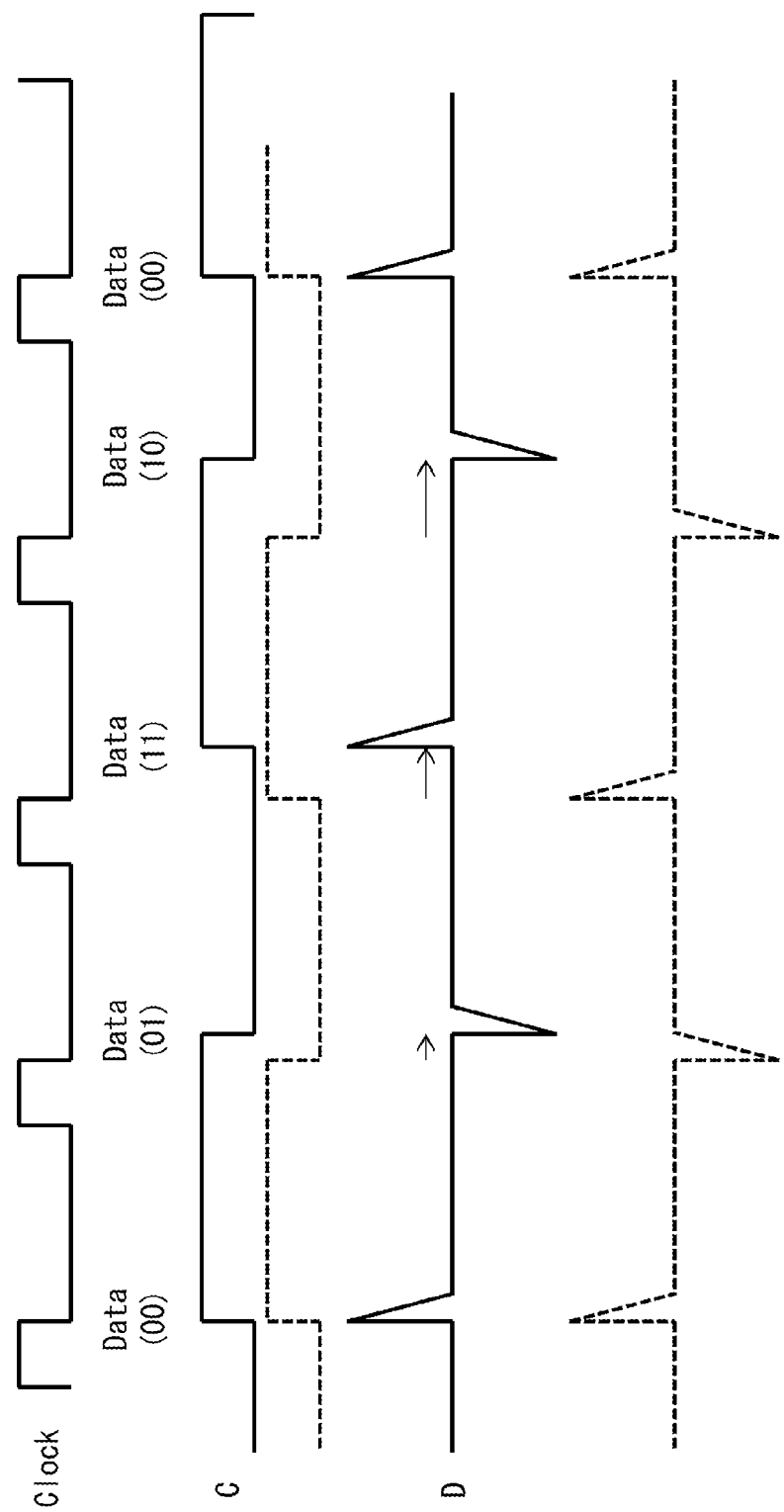

PULSE POSITION MODULATION SCHEME IMPULSE RADIO TRANSMITTER AND RADIO COMMUNICATION SYSTEM

CROSS-REFERENCE TO RELATED APPLICATION

This application is a continuation application of International Application PCT/JP2013/076851 filed on Oct. 2, 2013 and designated the U.S., the entire contents of which are incorporated herein by reference.

FIELD

The techniques disclosed in this application relate to a pulse position modulation scheme impulse radio transmitter and a radio communication system.

BACKGROUND

With an exponential increase in the number of Internet users and an increase in capacity and diversification of contents, such as high-definition images, an increase in transmission capacity is also desired in radio communication. As a high-capacity radio communication system, the use of a millimeter-wave band with which it is easy to secure a wide frequency band is suitable because of less commercial radio stations. Impulse scheme radio transmission is radio transmission using RF pulses as transmission media and is expected to be used for realizing a wide-band radio communication system.

An impulse scheme radio transmitter obtains a high-frequency pulse signal from a low-frequency pulse signal by multiplication, and therefore, the specific band of a bandpass filter is large as compared with that of a conventional transmitter. Further, a local oscillator or a mixer is not necessary and it is possible to use a low-frequency bandpass filter. Consequently, as compared with a carrier wave scheme narrow-band transmitter, the configuration of the radio unit is simple and inexpensive, and therefore, the impulse scheme radio transmitter is expected to be used for realizing high-capacity radio communication exceeding 10 gigabits per second (10 Gbps).

In the impulse scheme radio communication, ON/OFF modulation to transmit a millimeter-wave pulse in accordance with 1/0 of data and envelope detection are performed. The amount of data that can be transmitted per second (transmission rate) is determined by the pass frequency bandwidth of the bandpass filter. The use of the millimeter-wave band (30 GHz to 300 GHz), to which several frequency bandwidths as wide as several to several tens GHz are assigned for the radio communication use by law, is suitable to realize high-capacity communication at several tens gigabits per second (Gbps) with a simple system.

As the transmission unit of the recent impulse scheme radio transmitter, one that uses a so-called bipolar RZ (Return-to-Zero) type short-pulse generator that generates a pulse having the polarity opposite to that of the immediately preceding "1" in order to eliminate the limitation to the transmission power due to the bright line spectrum has been developed.

RELATED DOCUMENTS

[Patent Document 1] Japanese Laid Open Patent Document No. 2002-271428

[Patent Document 2] Japanese Laid Open Patent Document No. H10-508725

[Patent Document 3] Japanese Laid Open Patent Document No. 2013-34075

[Patent Document 4] Japanese Laid Open Patent Document No. 2007-518301

[Patent Document 5] Japanese Laid Open Patent Document No. 2013-157660

SUMMARY

According to an aspect of the embodiments, a pulse position modulation scheme impulse radio transmitter includes: a bipolar return-to-zero type short-pulse generator; a bandpass filter that has a predetermined pass frequency band and which allows an output of the bipolar return-to-zero type short-pulse generator to pass; a transmission amplifier that amplifies an output of the bandpass filter; and a transmission antenna, wherein the bipolar return-to-zero type short-pulse generator includes: a trigger flip-flop with a position modulation function that outputs a pulse-width-variable pulse in each period of a clock signal, the pulse-width-variable pulse being inverted in each period of the clock signal and the pulse width of the pulse-width-variable pulse differing in accordance with transmission data; and a pulse generation filter that generates a positive pulse or a negative pulse in accordance with a direction in which a varying edge of the pulse-width-variable pulse changes.

The object and advantages of the embodiments will be realized and attained by means of the elements and combination particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram illustrating a configuration example of an impulse radio transmission system;

FIG. 1B is a diagram illustrating a pass frequency band of the bandpass filter;

FIG. 4A is a diagram illustrating the configuration of the short-pulse generation unit of the pulse position modulation scheme impulse radio transmitter of the embodiment;

FIG. 4B illustrates the configuration of the trigger flip-flop (T-FF) with a position modulation function;

FIG. 5 is a timing chart for explaining an operation example of the short-pulse generation unit in FIG. 4;

DESCRIPTION OF EMBODIMENTS

Figure 2A:
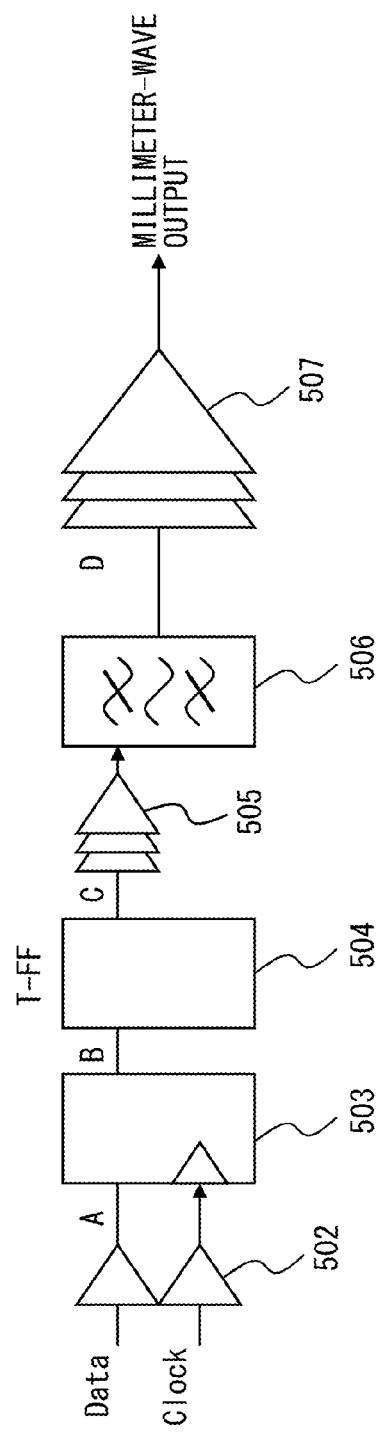
FIG. 2A is a diagram illustrating a configuration example of the short-pulse generation unit that is used in the bipolar RZ type impulse radio transmitter.

Before explaining a pulse position modulation scheme impulse radio transmitter and a radio transmission system of an embodiment, an impulse radio transmission system is explained.

FIG. 1A is a diagram illustrating a configuration example of an impulse radio transmission system.

The impulse radio transmission system has a transmitter and a receiver. The transmitter has a baseband signal generator 101, a short-pulse generation unit 102, a bandpass filter 103, a transmission amplifier 104, and a transmission antenna 105. The receiver has a reception antenna 121, a reception amplifier 122, a wave detector 123, a limit amplifier 124, and a baseband signal regenerator 125.

First, the transmitter is explained. The baseband signal generator 101 generates a data signal for each time slot and outputs the data signal to the short-pulse generation unit 102. As will be described later, the data signal turns to the high level when the value is "1" and turns to the low level when the value is "0". The communication rate of the data signal is, for example, 10 gigabits per second (Gbps). The short-pulse generation unit 102 generates a short pulse when the data signal turns to the high level in the time slot. The bandpass filter 103 performs filtering for allowing the short pulse to pass only a predetermined pass frequency band and outputs a millimeter-wave pulse A7.

FIG. 1B is a diagram illustrating a pass frequency band 132 of the bandpass filter 103. A short-pulse characteristic 131 indicates the frequency characteristic of a short pulse. The millimeter-wave pulse that the bandpass filter 103 outputs has the frequency component only in the portion of the pass frequency band 132 of the short-pulse characteristic 132. In the UWB (Ultra Wide Band) or the like, the frequency band that can be used is limited. The bandpass filter 103 is used in order to meet the limitation of the frequency band. For example, a pass lower limit frequency f1 of the pass frequency band 132 is 80 GHz and a pass upper limit frequency f2 is 90 GHz, and therefore, the pass frequency bandwidth is f2−f1=90−80=10 GHz.

The transmission amplifier 104 amplifies a millimeter-wave pulse and radio-transmits the transmission signal via the transmission antenna 105. The transmission signal represents data of "1" or "0" by presence or absence of the millimeter-wave pulse.

Next, the receiver is explained. The reception amplifier 122 amplifies the received signal radio-received via the reception antenna 121. The wave detector 123 detects and outputs the envelope of received signal (millimeter-wave pulse) amplified by the reception amplifier 122. The limit amplifier 124 amplifies the signal detected by the wave detector 123. The baseband signal regenerator 125 inputs the signal amplified by the limit amplifier 124 and regenerates, for example, data received at 10 Gbps.

It is possible to make use of the impulse scheme radio transmission system for UWB radio communication, such as the microwave band, the quasi-millimeter wave band, and the UWB radio communication. The impulse scheme has the characteristics that neither the oscillator nor the mixer is necessary and the configuration of the RF unit is simple and inexpensive as compared to the narrow-band communication scheme, and it is expected to realize wide-band radio communication exceeding 10 Gbps in the millimeter-wave band that can make use of a wide band.

If the frequency bandwidth assigned to the impulse radio transmission system is taken to be Bmax, when a pass frequency bandwidth Bbpf of the bandpass filter 103 is nearly equal to Bmax, the maximum communication rate Bmax is obtained. For example, in the case where the frequency bandwidth Bmax is 10 GHz, as illustrated in FIG. 1B, the pass frequency bandwidth Bbpf of the bandpass filter 103 is f2−f1=90−80=10 GHz and the communication rate of the data signal is 10 Gbps.

In many radio transmission systems, the signal strength per unit frequency (power spectrum density) is regulated by law and standards, for example, such as the signal strength 0 dBm per frequency of 1 MHz (=1 mW/MHz). If a bright line spectrum is included in the transmission signal, the signal strength of the bright line spectrum exceeds the limit of the above-described power spectrum density, and therefore, such a state is brought about where it is not possible to increase the average power in the entire frequency band. Specifically, when the assigned frequency band Bmax is 10 GHz (=10,000 MHz), if the transmission spectrum intensity is constant within the frequency band, an output of 1 (mW/MHz)×10,000 (MHz)=10 W is made possible. However, in the case where a bright line spectrum of 1 mW/MHz is included in the transmission signal, it is only possible to output small power. In order to transmit a signal over a long distance without an error, it is necessary to secure the signal strength margin against noise (SN ratio) or the like by maximizing the spectrum power in the entire frequency band. If the transmission power is limited by the bright line spectrum, it is not possible to secure a sufficient SN ratio. As described above, the transmission power is limited by the bright line spectrum and the long-distance and high-quality communication is disadvantageous, and therefore, it is desired to realize an impulse radio transmission system that does not cause the bright line spectrum to occur. Consequently, a bipolar return-to-zero (RZ) type impulse radio transmission system in which the transmission signal does not include the bright line spectrum and which is suitable to long-distance and high-quality communication has been proposed.

Figure 2B:
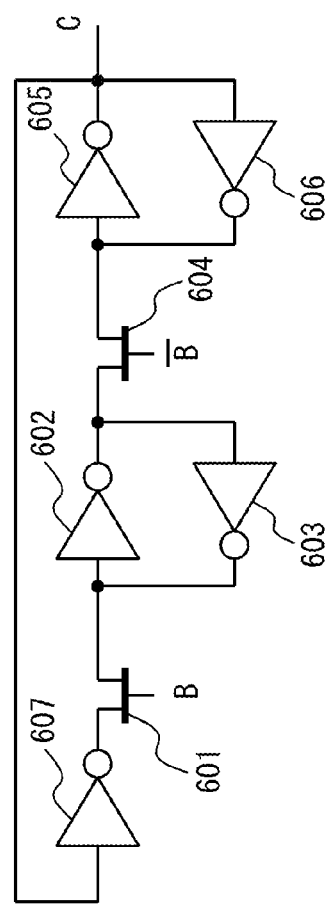
FIG. 2B illustrates a configuration of the trigger flip-flop (T-FF)

FIG. 2A is a diagram illustrating a configuration example of the short-pulse generation unit 102 that is used in the bipolar RZ type impulse radio transmitter (hereinafter, referred to as B-RZ transmitter) described in Patent Document 5. FIG. 2B illustrates a configuration of the trigger flip-flop (T-FF).

Figure 3:
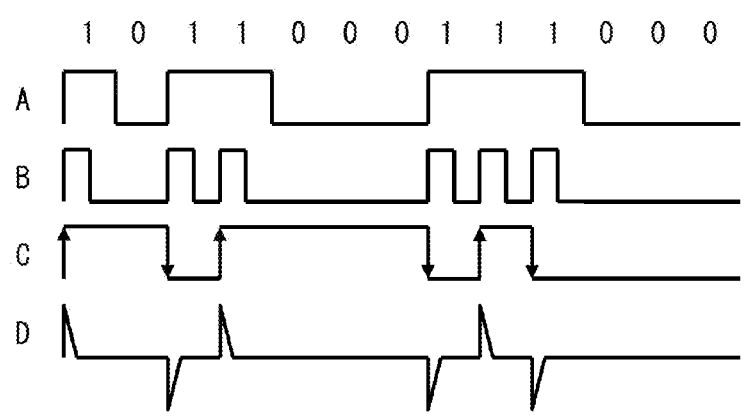
FIG. 3 is a timing chart for explaining an operation example of the short-pulse generation unit in FIG. 2.

FIG. 3 is a timing chart for explaining an operation example of the short-pulse generation unit 102 in FIG. 2A.

The short-pulse generation unit 102 has input buffers 501 and 502, an NRZ-RZ conversion unit 503, a trigger flip-flop (T-FF) 504, an edge shaping circuit 505, a pulse generation filter 506, and a pulse (wide-band) amplifier 507.

A data signal A is a non-return-to-zero signal. The input buffer 501 buffers the non-return-to-zero signal A and the input buffer 502 buffers a clock signal Clock. The NRZ-RZ (Non Return to Zero-Return to Zero) conversion unit 503 converts the non-return-to-zero signal A into a return-to-zero signal B. Specifically, the NRZ-RZ conversion unit 503 is a logical product (AND) circuit and calculates the logical product of the non-return-to-zero signal A and the clock signal Clock and outputs the logical product signal as the return-to-zero signal B.

The T-FF 504 is realized by a master-slave type flip-flop circuit that uses the return-to-zero signal B as a transfer gate signal as illustrated in FIG. 2B. The T-FF 504 has a master latch in which the input of an inverter 602 is connected to the output of an inverter 603 and the output of the inverter 602 is connected to the input of the inverter 603, a slave latch including inverters 605 and 606, and an inverter 607 provided on the feedback path of the output of the slave latch. The T-FF 504 further has transfer gates 601 and 604. The transfer gates 601 and 604 are formed by, for example, a transistor. This also applies to gates explained below. The transfer gate 601 is provided on the path through which the output of the slave latch is fed back to the master latch via the inverter 607, and the gate 604 is provided between the output of the master latch and the input of the slave latch, respectively. The conduction state of the transfer gate 601 is controlled by the return-to-zero signal B and the conduction state of the transfer gate 604 is controlled by the inverted signal of the return-to-zero signal B, respectively. As a result, the T-FF 504 operates as a frequency divider circuit of the return-to-zero signal B, which inverts an output signal C each time the return-to-zero signal B changes by one period. For example, each time the return-to-zero signal B changes by one period, such as high level to low level and to high level, the logic level of the output signal is inverted. In this manner, the logic of the output signal C is inverted in synchronization with the rising edge of the return-to-zero signal B.

The edge shaping circuit 505 outputs a signal obtained by making steep the rising edge and the falling edge of the output signal C of the T-FF 504 to the pulse generation filter 506. The output signal C the edges of which have been made steep is a signal the rise time and the fall time of which are short, and therefore, is a signal having a spectrum up to a higher frequency.

The edge shaping circuit 505 is realized by, for example, an even number of inverters connected in series. It may also be possible to design the edge shaping circuit 505 so as to be capable of obtaining a steeper edge by providing an inductor that gives peaking.

The inverter is realized by connecting a p-channel MOS transistor and an n-channel MOS transistor in series between power sources, applying an input signal to the gates of the two transistors, and obtaining an inverted signal from the connection node of the pMOS transistor and the nMOS transistor. Inverters used in other portions are also realized similarly.

The pulse generation filter 506 is a high-pass filter or a bandpass filter. The pulse generation filter 506 outputs a signal D that indicates presence or absence of a pulse in accordance with a value (value of 1) of the data signal A and in which a positive pulse and a negative pulse are formed alternately by removing the low-frequency component of the output signal of the edge shaping circuit 505. For example, the pulse generation filter 506 is realized by using capacitor elements connected in series. The wide-band amplifier 507, which is a wide-band amplifier or a distribution type amplifier, amplifies the output signal D of the pulse generation filter 506 and outputs the amplified signal to the bandpass filter 103 in FIG. 1A.

In the case where the edge of the signal C is sufficiently steep, the edge shaping circuit 505 may be removed. Further, in the case where the magnitude of the signal D is sufficient, the wide-band amplifier 507 may be removed.

The bipolar short pulse that is output to the bandpass filter 103 from the short-pulse generation unit 102 is a pulse that indicates presence and absence of a pulse in accordance with a value of the data signal, and as the bipolar short pulse, positive and negative pulses are generated alternately. For example, a positive pulse or a negative pulse is generated as the bipolar short pulse when the value of the data signal is "1" and the bipolar short pulse is the reference voltage when the value of the data signal is "0". The positive pulse is a positive-voltage pulse with respect to the reference voltage and the negative pulse is a negative-voltage pulse with respect to the reference voltage. In other words, the bipolar short pulse is a pulse having the polarity opposite to that of the immediately preceding pulse.

The bipolar short pulse differs from the unipolar short pulse only in that the phase of the high-frequency component is reversed, and the envelope of the signal is the same. The wave detector 123 in FIG. 1A detects the envelope of the received signal. Consequently, the reception unit of the impulse radio communication device in FIG. 1A may have the same configuration both in the case of receiving the unipolar short pulse and in the case of receiving the bipolar short pulse.

In the case where the bipolar short pulse is used, a notch (concave part) occurs at frequencies, which are integer multiples of the communication rate (10 Gbps), and therefore, the power spectrum density is small. Because of this, as compared with the case where the unipolar short pulse is used, it is possible to decrease the maximum value of the signal strength per unit frequency and it is made easy to secure transmission power, and therefore, an advantage is obtained when performing long-distance high-quality communication.

The impulse radio communication system, with the unipolar RZ system and the bipolar RZ system being included, has such a problem that the number of transmission bits per frequency bandwidth that is used is small, i.e., frequency use efficiency is low. In the impulse radio communication, ON/OFF modulation is performed, and therefore, in the case where a frequency bandwidth of 10 GHz is used, it is only possible to perform data transmission of 10 Gbps at the maximum. In the case where mutual interference is problematic because radio communication systems come close to each other, or in the case where it is requested to increase the transmission rate by using the same frequency band, a communication system with high frequency use efficiency is demanded.

In order to improve the frequency use efficiency of a radio transmission device, a method of multiplexing a plurality of bits on one symbol, i.e., so-called value multiplexing is effective. In the case of pulse transmission, the pulse position modulation (PPM) for transmitting information by changing the position at which a pulse appears is known.

In the case where the pulse position modulation is performed in the impulse radio communication system, one pulse is disposed within one period and the position (phase) at which a pulse is disposed is changed in accordance with transmission data. The impulse radio communication system that performs the pulse position modulation is not known so much hitherto and although Patent Document 4 has disclosed the receiver in the impulse radio communication system that performs the pulse position modulation, a transmitter is not known in particular.

A problem of the conventional impulse scheme radio communication system, with the bipolar RZ scheme radio communication system being included, is that the number of transmission bits per frequency bandwidth to be used is small, i.e., frequency use efficiency is low. The ON/OFF modulation is performed, and therefore, in the case where a frequency bandwidth of 10 GHz is used, it is only possible to perform data transmission of 10 Gbps at the maximum. Accordingly, a communication system with high frequency use efficiency is demanded.

In the embodiment explained below, a pulse position modulation scheme impulse radio transmitter with a simple configuration is disclosed.

The pulse position modulation scheme impulse radio communication system of the embodiment has the same configuration as that of the communication system illustrated in FIG. 1A, but the configuration of the short-pulse generation unit 102 of the transmitter is different from that explained above.

FIG. 4A is a diagram illustrating the configuration of the short-pulse generation unit of the pulse position modulation scheme impulse radio transmitter of the embodiment and FIG. 4B illustrates the configuration of the trigger flip-flop (T-FF) with a position modulation function.

FIG. 5 is a timing chart for explaining an operation example of the short-pulse generation unit in FIG. 4.

The short-pulse generation unit 102 of the embodiment has a serial-parallel (S-P) conversion unit 701, a selector 702, a clock buffer 703, a T-FF with a position modulation function 704, the edge shaping circuit 505, the pulse generation filter 506, and the pulse amplifier 507.

The serial-parallel (S-P) conversion unit 701 converts the transmission data of serial data into 2-bit parallel data. In the case where the transmission data is 2-bit parallel data, it is not necessary to provide the S-P conversion unit 701. Further, in the case where the transmission data is 2×N-bit parallel data, it is only necessary to provide a selector that selects two bits at a time in order from the parallel data, in place of the S-P conversion unit 701.

The selector 702 sets one of four selector outputs to the high level (High) and the rest to the low level (Low) in accordance with (0, 0), (0, 1), (1, 1), and (1, 0) of the 2-bit transmission data. In other words, the selector 702 functions as a decoder. In the case where signals corresponding to the four selector outputs are input, it is possible to remove the selector 702.

The clock buffer 703 buffers the clock signal Clock.

The T-FF with a position modulation function 704 will be described later.

The edge shaping circuit 505, the pulse generation filter 506, and the pulse amplifier 507 are the same as those explained in FIG. 2A, and therefore, explanation thereof is omitted.

The T-FF with a position modulation function 704 has the configuration as illustrated in FIG. 4B. The T-FF 704 has a master latch in which the input of an inverter 802 is connected to the output of an inverter 803 and the output of the inverter 802 is connected to the input of the inverter 803, a slave latch including inverters 805 and 806, and an inverter 807 provided on the feedback path of the output of the slave latch. The T-FF 704 further has transfer gates 801 and 804. The transfer gate 801 is provided on the path through which the output of the slave latch is fed back to the master latch via the inverter 807, and the transfer gate 804 is provided between the output of the master latch and the input of the slave latch, respectively. The conduction state of the transfer gate 801 is controlled by the clock signal Clock and the conduction state of the transfer gate 804 is controlled by the inverted signal of the clock signal Clock, respectively.

The T-FF 704 further has a variable delay unit 810 connected between the output of the inverter 805 and the input of the inverter 806 (output node of the T-FF with a position modulation function 704) in the slave latch. The variable delay unit 810 has four signal paths connected in parallel between the output of the inverter 805 and the input of the inverter 806. The first signal path has only a transfer gate 811. The second signal path has a transfer gate 812, a buffer 813, and a transfer gate 814 connected in series. The third signal path has a transfer gate 815, buffers 816 and 817, and a transfer gate 818 connected in series. The fourth signal path has a transfer gate 819, buffers 820, 821, and 822, and a transfer gate 823 connected in series. To the gate of the transfer gate 811, a signal that turns to High in accordance with the transmission data (0, 0) of the selector 702 is applied. To the gates of the transfer gates 812 and 814, a signal that turns to High in accordance with the transmission data (0, 1) of the selector 702 is applied. To the gates of the transfer gates 815 and 818, a signal that turns to High in accordance with the transmission data (1, 1) of the selector 702 is applied. To the gates of the transfer gates 819 and 823, a signal that turns to High in accordance with the transmission data (1, 0) of the selector 702 is applied. Consequently, in accordance with the transmission data (0, 0) of the selector 702, the first signal path is selected, in accordance with (0, 1), the second signal path is selected, in accordance with (1, 1), the third signal path is selected, and in accordance with (1, 0), the fourth signal path is selected. The number of buffers of the first to fourth signal paths is zero to three, and in accordance with the number of buffers, a difference in the time until the change in the output of the inverter 805 appears at the input of the inverter 806 (the output node C) arises.

In the T-FF 704 illustrated in FIG. 4B, the output signal C alternately changes to High and Low for each period of the clock signal Clock. Further, in the T-FF 704, when the clock signal Clock falls, the input of the inverter 805 changes and the output signal C changes. Consequently, depending on the selection of one of the four signal paths, the period of time from the falling edge of the clock signal Clock until the output signal C changes differs.

As illustrated in FIG. 5, the output signal C of the T-FF 704 changes for each period of the clock signal Clock and the time of the varying edge of the output signal C from the falling edge of the clock signal Clock differs in accordance with the value of transmission data Data. As described previously, the pulse generation filter 506 extracts the high-frequency component of the signal C with the bandpass filter function and outputs the output signal D the pulse of which is a positive pulse or a negative pulse in accordance with the rising edge or the falling edge of the output signal C. Consequently, pulse generation filter 506 outputs the signal D the pulse of which is a positive pulse or a negative pulse at the positions different in accordance with the output data Data. In FIG. 5, the broken lines indicate the output signal C of the T-FF 704 and the output signal D of the pulse generation filter 506 in the case where the transmission data Data is fixed to (0, 0). After being amplified by the pulse amplifier 507, the signal D is output to the bandpass filter 103.

As explained above, the pulse position modulation scheme impulse radio transmitter of the embodiment outputs one pulse for each period by changing the position during one period in accordance with the four-valued (2-bit) transmission data. As illustrated in FIG. 5, the positive pulse and the negative pulse of the output signal D appear at the position in accordance with the value of the transmission data.

As described above, the positive pulse and the negative pulse of the output signal D are disposed at different positions (in different phases) between the falling edge and the rising edge of the clock signal Clock in accordance with the transmission data. It is desirable that the difference in position between the positive pulse and the negative pulse of the output signal D be as wide as possible so as to enable the receiver side to easily identify the difference. Because of this, it is desirable that the period of time during which the clock signal Clock is High be short and the period of time during which the clock signal Clock is Low be long. In other words, it is desirable that the duty be small. Due to this, the period of time that is necessary to perform position modulation is lengthened, and more value multiplexing is made possible as well as a margin between close states can be obtained.

In the above explanation, the example is explained in which the output signal C of the T-FF 704 changes in accordance with the falling edge of the clock signal Clock. However, in the case where the clock signal Clock that is input to the gates of the transfer gate 801 and 804 is inverted, the output signal C of the T-FF 704 changes in accordance with the rising edge of the clock signal Clock. In this case, it is desirable that the period of time during which the clock signal Clock is High be long and the period of time during which the clock signal Clock is Low be short. In other words, it is desirable that the duty be large.

As above, the transmitter of the pulse position modulation scheme impulse radio communication system of the embodiment is explained. The receiver is realized by, for example, the impulse radio receiver equipped with the function to detect the pulse position described in Patent Document 1 or 4.

Further, in the pulse position modulation scheme impulse radio communication system of the embodiment, the synchronization check processing is performed on the transmission side and on the reception side at the time of start of communication and at fixed time intervals. Hereinafter, the pulse position modulation scheme impulse radio receiver that performs the synchronization check processing is explained.

Figure 6A:
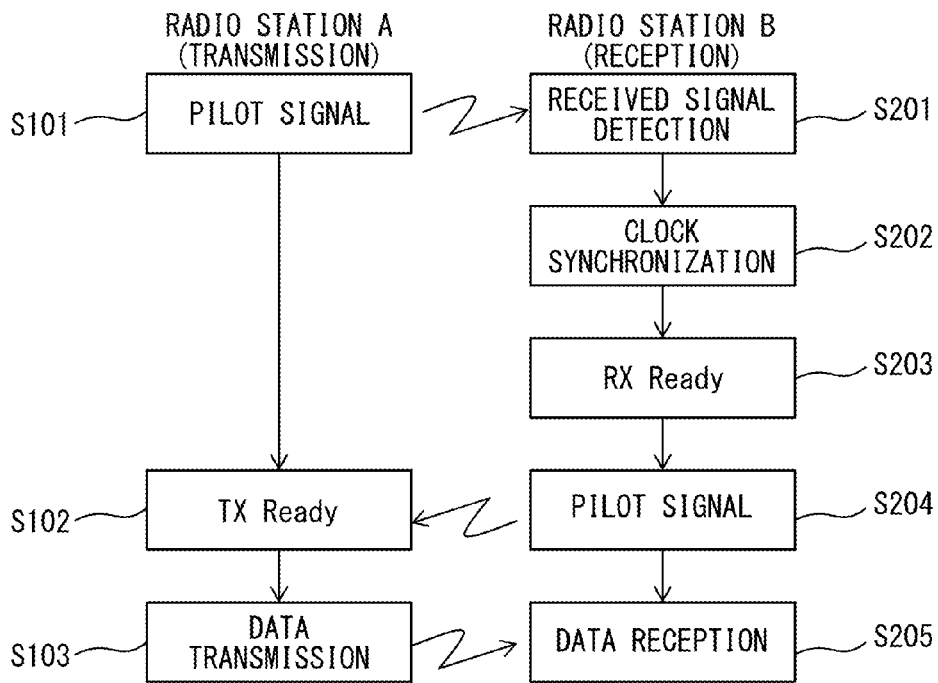
FIG. 6A is a flowchart explaining the reception algorithm of the pulse position modulation scheme impulse radio communication system that performs the synchronization check processing at the time of start of communication.
Figure 6B:
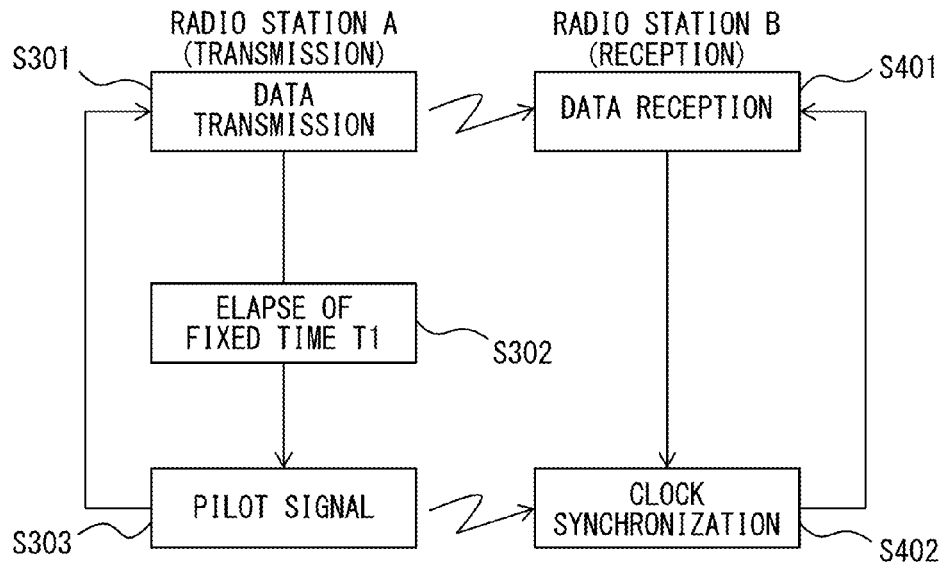
FIG. 6B is a flowchart explaining the reception algorithm of the pulse position modulation scheme impulse radio communication system that performs the synchronization check processing during communication.

FIG. 6A and FIG. 6B are flowcharts each explaining the reception algorithm of the pulse position modulation scheme impulse radio communication system that performs the synchronization check processing, and FIG. 6A illustrates processing at the time of start of communication and FIG. 6B illustrates processing during communication.

As illustrated in FIG. 6A, at the time of start of communication, at step S101, a radio station A on the transmission side transmits a pilot signal to a radio station B on the reception side.

At step S201, the radio station B on the reception side detects the received signal and extracts a clock signal.

At step S202, the radio station B on the reception side performs clock synchronization processing to synchronize the received clock with the extracted clock signal.

At step S203, the radio station B on the reception side performs processing necessary for further performing communication on the reception side and completes the preparation of communication (Rx Ready) after the clock synchronization processing ends.

At step S204, the radio station B on the reception side transmits a pilot signal to the radio station A on the transmission side.

At step S102, the radio station A on the transmission side detects the received signal, and performs processing necessary for performing communication and completes the preparation of communication (Tx Ready). Due to this, the synchronization check processing ends.

At step S103, the radio station A on the transmission side transmits data.

At step S205, the radio station B on the reception side receives the transmitted data.

As illustrated in FIG. 6B, during communication, at step S301, the radio station A on the transmission side transmits data.

At step S401, the radio station B on the reception side receives the transmitted data.

After this, until a fixed time elapses, the data transmission/reception operation is repeated.

The radio station A on the transmission side measures time and when detecting that a fixed time T1 has elapsed at step S302, the radio station A on the transmission side proceeds to step S303.

At step S303, as at step S101, the radio station A on the transmission side transmits a pilot signal to the radio station B on the reception side.

At step S402, the radio station B on the reception side performs the clock synchronization processing at steps S201 and S202 and updates the clock synchronization.

After this, the radio station A on the transmission side returns to step S301, the radio station B on the reception side returns to step S401, and both repeat the data transmission/reception operation.

Figure 7:
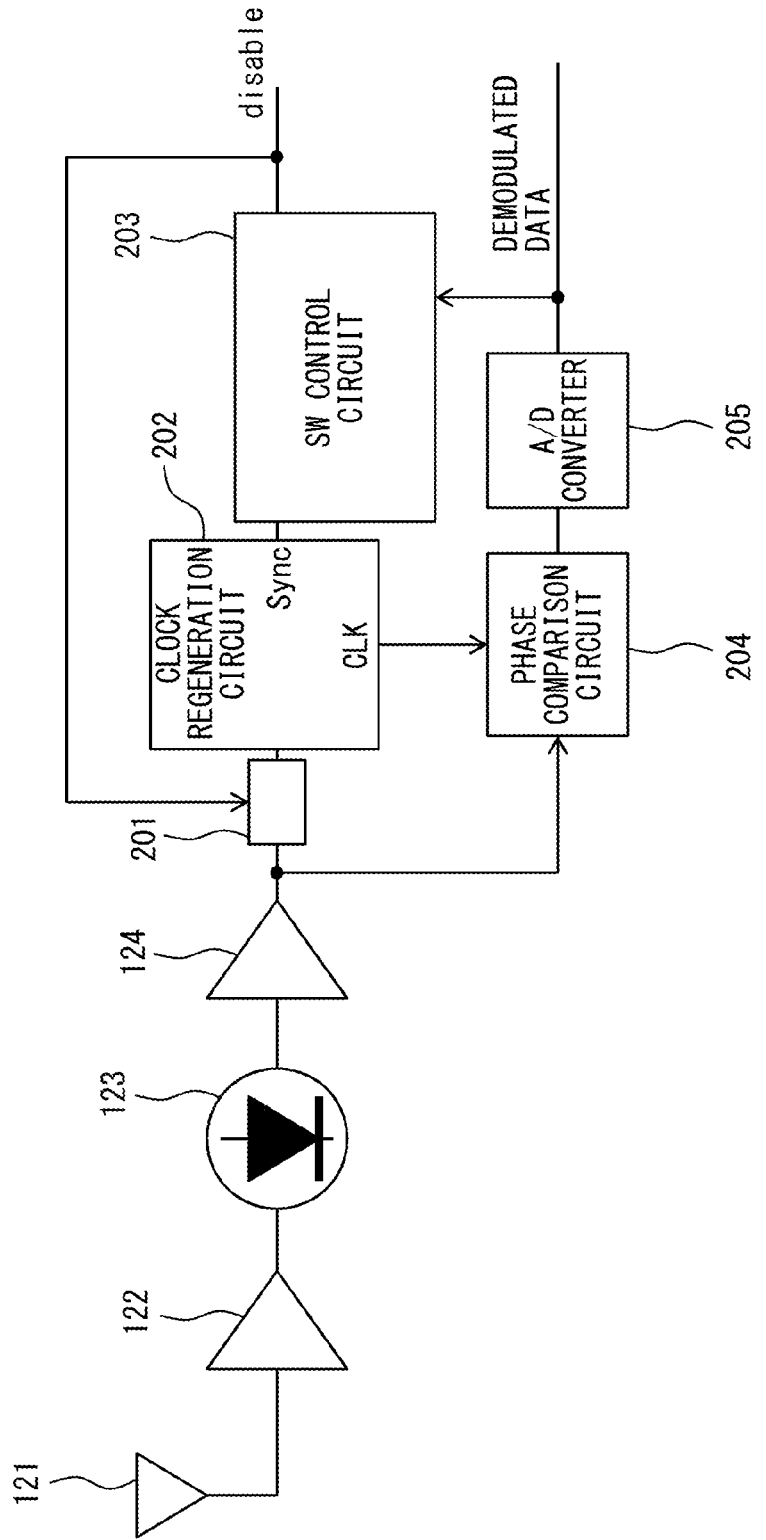
FIG. 7 is a diagram illustrating the configuration of the pulse position modulation scheme impulse radio receiver that performs the reception algorithm illustrated in FIG. 6A and FIG. 6B.

FIG. 7 is a diagram illustrating the configuration of the pulse position modulation scheme impulse radio receiver that performs the reception algorithm illustrated in FIG. 6A and FIG. 6B.

The receiver in FIG. 7 has the reception antenna 121, the reception amplifier 122, the wave detector 123, and the limit amplifier 124 like the receiver illustrated in FIG. 1A, in addition to a portion that performs the synchronization check processing. The receiver in FIG. 7 also has the baseband signal regenerator 125, but not illustrated in FIG. 7. The reception antenna 121, the reception amplifier 122, the wave detector 123, the limit amplifier 124, and the baseband signal regenerator 125, not illustrated, are the same as those of a common receiver. The portion that performs the synchronization check processing is formed within the baseband signal regenerator 125 and has a switch (SW) 201, a clock regeneration circuit 202, a switch (SW) control circuit 203, a phase comparison circuit 204, and an AD converter 205. The phase comparison circuit 204 and the AD converter 205 are portions relating to the normal data signal regeneration and the phase comparison circuit 204 receives a reception clock signal CLK from the clock regeneration circuit 202 and detects the phase (position) of the pulse.

At the time of start of communication, the SW control circuit 203 turns on the switch 201 so that the output of the limit amplifier 124 is input to the clock regeneration circuit 202. In the case where the clock is regenerated by making use of the pilot signal and clock synchronization is attained in this state, the clock regeneration circuit 202 turns a Sync signal to High. In the case where end of the pilot signal is detected in demodulated data in this state, the SW control circuit 203 turns off the switch 201 and after this, the clock regeneration circuit 202 operates by itself. The phase comparison circuit 204 detects a phase difference between the reception clock signal CLK from the clock regeneration circuit 202 and the pulse, and the AD converter 205 demodulates the data.

In the case of detecting start of the pilot signal in the demodulated data that is supplied form the AD converter 205, the SW control circuit 203 outputs a signal that turns the demodulated data to disable and performs the synchronization operation again.

As above, the pulse position modulation scheme impulse radio communication system of the embodiment is explained, but it is needless to say that there can be various modification examples. Hereinafter, modification examples of the T-FF 704 of the pulse position modulation scheme impulse radio receiver are explained.

Figure 8:
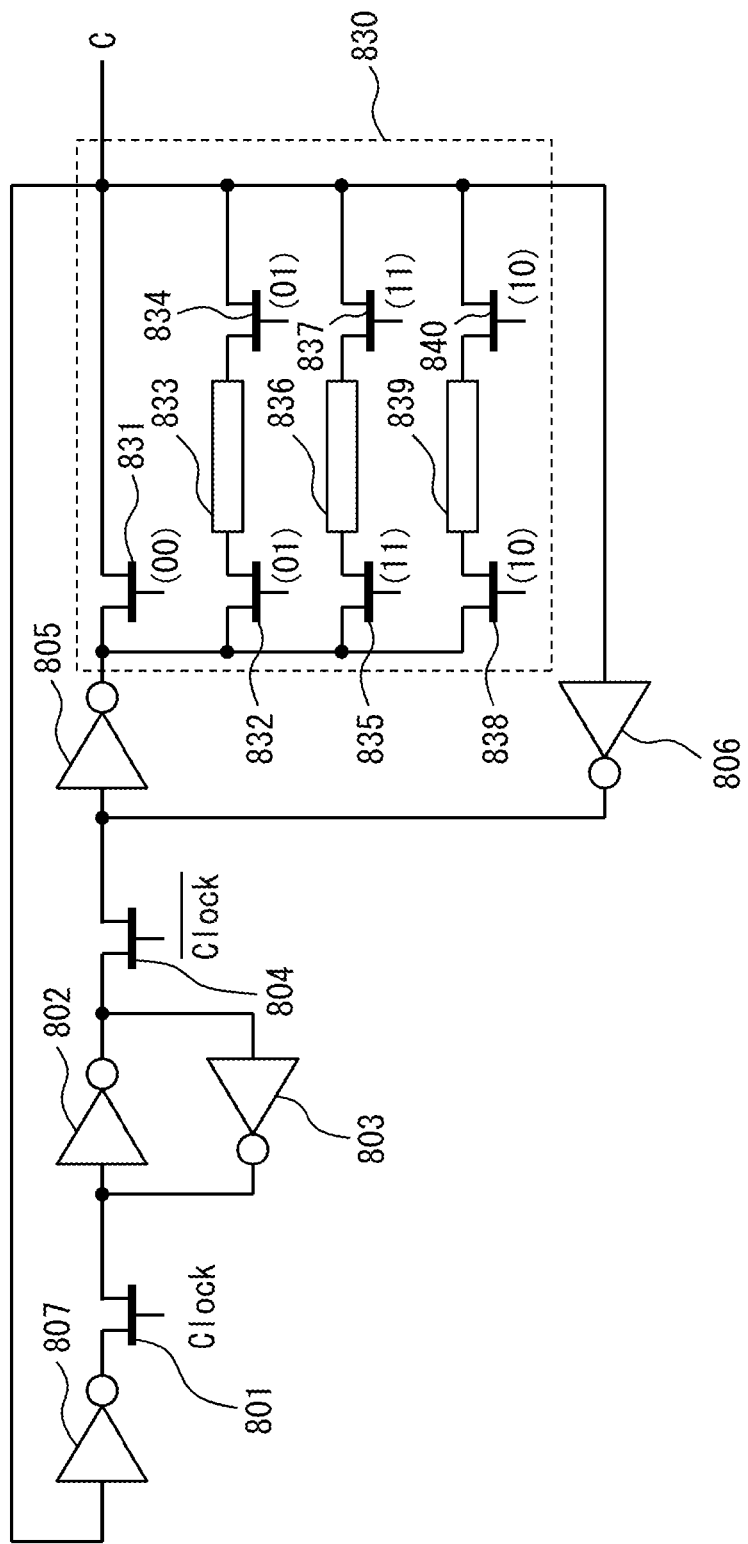
FIG. 8 is a diagram illustrating a variable delay unit realized by delay lines.

FIG. 8 is a diagram illustrating a variable delay unit 830 realized by delay lines.

The variable delay unit 830 in FIG. 8 has a configuration in which the buffers 813, 816 and 817, and 820 to 822 of the variable delay unit 810 illustrated in FIG. 4 are replaced with delay lines 833, 836, and 839. The delay amounts of signal are different for the delay lines 833, 836, and 839. The delay lines 833, 836, and 839 are realized by publicly known delay lines, which are combinations of resistors, coils (inductors), capacitors, transistors, etc.

Figure 9:
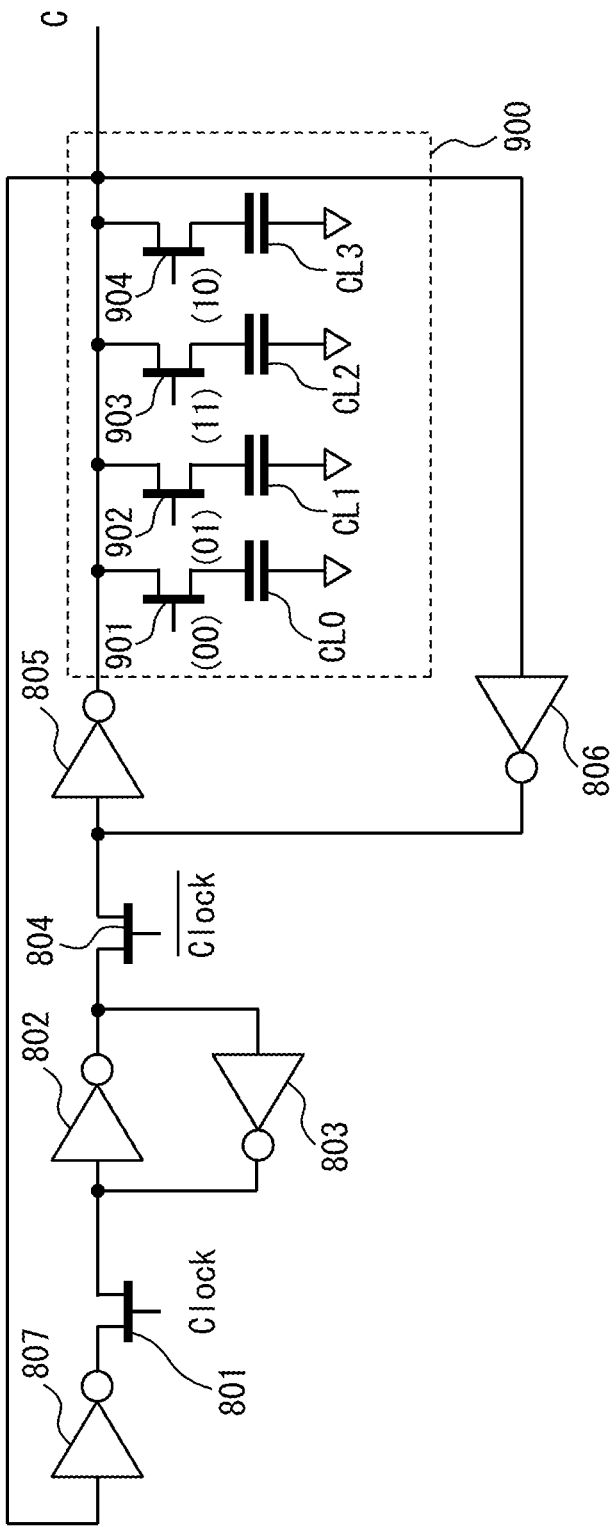
FIG. 9 is a diagram illustrating a variable delay unit realized by switching load capacitors.

FIG. 9 is a diagram illustrating a variable delay unit 900 realized by switching load capacitors.

The variable delay unit 900 in FIG. 9 is connected between the output (output node of the signal C) of the inverter 805 of the slave latch and the reference power source (GND) and has a plurality of load capacities for which it is possible to select connection or non-connection. The plurality of load capacities is realized by connecting in series a plurality of gates 901 to 901 and a plurality of capacities CL0 to CL3 having different capacitance values, respectively. The conduction of the gates of transistors forming the gates 901 to 904 is controlled by transmission data (0, 0), (0, 1), (1, 1), and (1, 0). In the case where the gate to which the capacitor having a small capacitance value is connected is brought into conduction, the delay amount is small, but in the case where the gate to which the capacitor having a large capacitance value is connected is brought into conduction, the delay amount is large.

Figure 10:
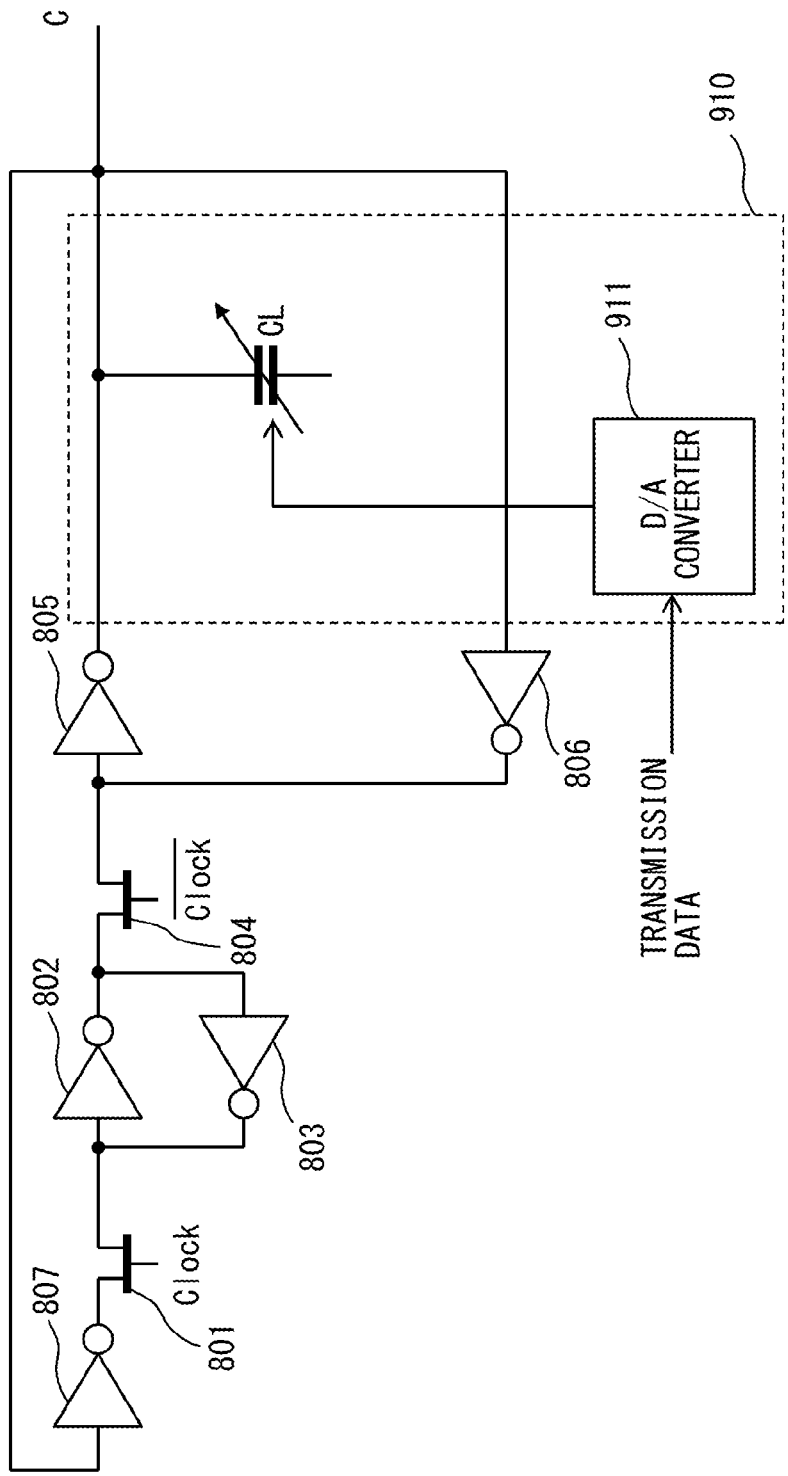
FIG. 10 is a diagram illustrating a variable delay unit realized by a variable capacitor.

FIG. 10 is a diagram illustrating a variable delay unit 910 realized by a variable capacitor.

The variable delay unit 910 in FIG. 10 has a variable capacitor CL connected between the output of the inverter 805 of the slave latch and the GND, and a D/A converter 911 that generates an analog signal for setting the capacitance value of the variable capacitor CL from transmission data.

Figure 11:
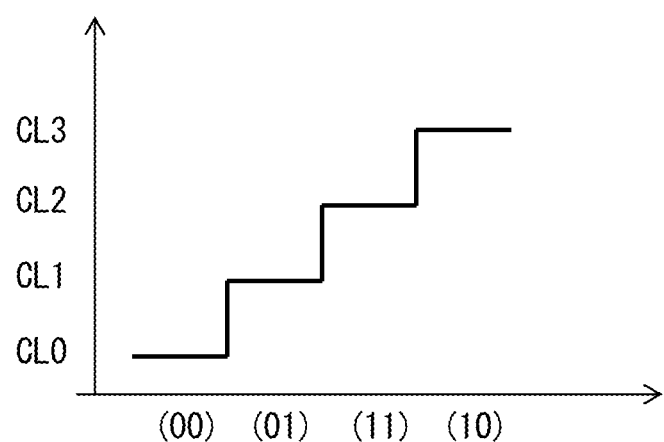
FIG. 11 is a diagram illustrating an example of a change in the capacitance value of the variable capacitor CL in the case where transmission data (0, 0), (0, 1), (1, 1), and (1, 0) is supplied to the D/A converter.

FIG. 11 is a diagram illustrating an example of a change in the capacitance value of the variable capacitor CL in the case where transmission data (0, 0), (0, 1), (1, 1), and (1, 0) is supplied to the D/A converter 911.

In the case where the capacitance value of the variable capacitor CL is set to a small value, the delay amount is small, but in the case where the capacitance value is set to a large value, the delay amount is large.

According to the pulse position modulation scheme impulse radio communication system of the embodiment explained above, it is possible to improve frequency use efficiency. In addition, the time at which the pulse appears varies randomly, and therefore, the effect to suppress the line spectrum is also obtained. The configurations of the radio communication system and the transmitter explained above are suitable to a communication device that transmits a large capacity of about 10 Gbps by using an ultra high frequency band higher than or equal to 70 GHz. In the case of a transmission rate of about 10 Gbps, the delay amount of the four-valued PPM is an order of magnitude of about 10 ps, which is about the same as the delay time of the buffer or the inverter. As a result of this, both the size and the power consumption of the transmitter itself become optimum.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A pulse position modulation scheme impulse radio transmitter comprising:
    a bipolar return-to-zero type short-pulse generator;
    a bandpass filter that has a predetermined pass frequency band and which allows an output of the bipolar return-to-zero type short-pulse generator to pass;
    a transmission amplifier that amplifies an output of the bandpass filter; and
    a transmission antenna, wherein
    the bipolar return-to-zero type short-pulse generator includes:
        a trigger flip-flop with a position modulation function that outputs a pulse-width-variable pulse in each period of a clock signal, the pulse-width-variable pulse being inverted in each period of the clock signal and the pulse width of the pulse-width-variable pulse differing in accordance with transmission data; and
        a pulse generation filter that generates a positive pulse or a negative pulse in accordance with a direction in which a varying edge of the pulse-width-variable pulse changes, wherein
    the trigger flip-flop with a position modulation function has a master-slave circuit, and
    a slave unit of the master-slave circuit includes a first inverter, a second inverter, and a variable delay circuit the delay amount of which is selected by a signal from a selector unit, wherein an input terminal of the first inverter is connected to an output terminal of the second inverter, an input terminal of the variable delay circuit is connected to an output terminal of the first inverter, and an input terminal of the second inverter is connected to an output terminal of the variable delay circuit.

2. The pulse position modulation scheme impulse radio transmitter according to claim 1, wherein
    the bipolar return-to-zero type short-pulse generator includes:
        an edge shaping circuit that makes steep a varying edge of an output signal of the trigger flip-flop with a position modulation function; and
        a pulse amplifier that amplifies an output of the edge shaping circuit.

3. The pulse position modulation scheme impulse radio transmitter according to claim 1, wherein
    the bipolar return-to-zero type short-pulse generator includes:
        a serial-parallel conversion circuit that converts serial data into parallel data; and
        a selector that selects transmission data determined by a data pattern from the parallel data.

4. The pulse position modulation scheme impulse radio transmitter according to claim 1, wherein the trigger flip-flop with a position modulation function receives the clock signal having the same frequency as that of the symbol transmission rate, and in the case where trigger flip-flop with a position modulation function changes an output in accordance with the rising edge of the clock signal, the period of time during which the clock signal is at a low level is short, and in the case where trigger flip-flop with a position modulation function changes an output in accordance with the falling edge of the clock signal, the period of time during which the clock signal is at a high level is short.

5. The pulse position modulation scheme impulse radio transmitter according to claim 1, wherein the variable delay circuit includes a plurality of columns of inverters or buffers in different numbers connected in series, and selects one of the plurality of columns in accordance with the transmission data.

6. The pulse position modulation scheme impulse radio transmitter according to claim 1, wherein the variable delay circuit includes a variable load capacitor connected to the output of the slave unit and adjusts a value of the variable load capacitor in accordance with the transmission data.

7. The pulse position modulation scheme impulse radio transmitter according to claim 2, wherein the bipolar return-to-zero type short-pulse generator includes:
  a serial-parallel conversion circuit that converts serial data into parallel data; and
  a selector that selects transmission data determined by a data pattern from the parallel data.

8. The pulse position modulation scheme impulse radio transmitter according to claim 2, wherein the trigger flip-flop with a position modulation function receives the clock signal having the same frequency as that of the symbol transmission rate, and in the case where trigger flip-flop with a position modulation function changes an output in accordance with the rising edge of the clock signal, the period of time during which the clock signal is at a low level is short, and in the case where trigger flip-flop with a position modulation function changes an output in accordance with the falling edge of the clock signal, the period of time during which the clock signal is at a high level is short.

9. The pulse position modulation scheme impulse radio transmitter according to claim 3, wherein the trigger flip-flop with a position modulation function receives the clock signal having the same frequency as that of the symbol transmission rate, and in the case where trigger flip-flop with a position modulation function changes an output in accordance with the rising edge of the clock signal, the period of time during which the clock signal is at a low level is short, and in the case where trigger flip-flop with a position modulation function changes an output in accordance with the falling edge of the clock signal, the period of time during which the clock signal is at a high level is short.

10. The pulse position modulation scheme impulse radio transmitter according to claim 7, wherein the trigger flip-flop with a position modulation function receives the clock signal having the same frequency as that of the symbol transmission rate, and in the case where trigger flip-flop with a position modulation function changes an output in accordance with the rising edge of the clock signal, the period of time during which the clock signal is at a low level is short, and in the case where trigger flip-flop with a position modulation function changes an output in accordance with the falling edge of the clock signal, the period of time during which the clock signal is at a high level is short.

11. A pulse position modulation scheme impulse radio communication system comprising:

a pulse position modulation scheme impulse radio transmitter; and a receiver including a reception antenna, a reception amplifier that amplifies a signal received by the reception antenna, and a wave detector that detects an output signal of the reception amplifier and extracts received data, wherein the pulse position modulation scheme impulse radio transmitter including:

a bipolar return-to-zero type short-pulse generator;

a bandpass filter that has a predetermined pass frequency band and which allows an output of the bipolar return-to-zero type short-pulse generator to pass;

a transmission amplifier that amplifies an output of the bandpass filter; and a transmission antenna, wherein the bipolar return-to-zero type short-pulse generator includes:

a trigger flip-flop with a position modulation function that outputs a pulse-width-variable pulse in each period of a clock signal, the pulse-width-variable pulse being inverted in each period of the clock signal and the pulse width of the pulse-width-variable pulse differing in accordance with transmission data; and a pulse generation filter that generates a positive pulse or a negative pulse in accordance with a direction in which a varying edge of the pulse-width-variable pulse changes, wherein the trigger flip-flop with a position modulation function has a master-slave circuit, and a slave unit of the master-slave circuit includes a first inverter, a second inverter, and a variable delay circuit the delay amount of which is selected by a signal from a selector unit, wherein an input terminal of the first inverter is connected to an output terminal of the second inverter, an input terminal of the variable delay circuit is connected to an output terminal of the first inverter, and an input terminal of the second inverter is connected to an output terminal of the variable delay circuit.

12. The pulse position modulation scheme impulse radio communication system according to claim 11, wherein the bipolar return-to-zero type short-pulse generator includes:

an edge shaping circuit that makes steep a varying edge of an output signal of the trigger flip-flop with a position modulation function; and a pulse amplifier that amplifies an output of the edge shaping circuit.

13. The pulse position modulation scheme impulse radio communication system according to claim 11, wherein the bipolar return-to-zero type short-pulse generator includes:

a serial-parallel conversion circuit that converts serial data into parallel data; and a selector that selects transmission data determined by a data pattern from the parallel data.

14. The pulse position modulation scheme impulse radio communication system according to claim 11, wherein
the trigger flip-flop with a position modulation function receives the clock signal having the same frequency as that of the symbol transmission rate, and
in the case where trigger flip-flop with a position modulation function changes an output in accordance with the rising edge of the clock signal, the period of time during which the clock signal is at a low level is short, and in the case where trigger flip-flop with a position modulation function changes an output in accordance with the falling edge of the clock signal, the period of time during which the clock signal is at a high level is short.

15. The pulse position modulation scheme impulse radio communication system according to claim 11, wherein
the variable delay circuit includes a plurality of columns of inverters or buffers in different numbers connected in series, and selects one of the plurality of columns in accordance with the transmission data.

16. The pulse position modulation scheme impulse radio communication system according to claim 11, wherein
the variable delay circuit includes a variable load capacitor connected to the output of the slave unit and adjusts a value of the variable load capacitor in accordance with the transmission data.

\* \* \* \* \*